United States Patent [19]

Arbeiter

[11] Patent Number: 5,893,573
[45] Date of Patent: Apr. 13, 1999

[54] ROTARY HANDLEBAR-MOUNTABLE GEARSHIFT ACTUATOR FOR BICYCLES

[75] Inventor: Markus Arbeiter, Würzburg, Germany

[73] Assignee: SRAM Deutschland GmbH, Schweinfurt, Germany

[21] Appl. No.: 09/089,691

[22] Filed: Jun. 3, 1998

[30] Foreign Application Priority Data

Jun. 4, 1997 [DE] Germany ............... 197 23 346

[51] Int. Cl.$^6$ ........................................... B62M 9/16
[52] U.S. Cl. ........................ 280/238; 74/502.2; 74/489
[58] Field of Search ................................ 280/238, 260; 74/502.2, 526, 489; 403/349

[56] References Cited

U.S. PATENT DOCUMENTS

| | | | |
|---|---|---|---|
| 4,840,081 | 6/1989 | Nagano | 74/502.2 |
| 4,876,913 | 10/1989 | Romano | 74/535 |
| 5,145,276 | 9/1992 | Demange | 403/349 |
| 5,310,276 | 5/1994 | Bergers et al. | 403/349 |
| 5,438,889 | 8/1995 | Tagawa | 74/475 |
| 5,540,456 | 7/1996 | Meier-Burkamp et al. | 280/236 |
| 5,799,541 | 9/1998 | Arbeiter | 74/489 |

FOREIGN PATENT DOCUMENTS

| | | | |
|---|---|---|---|
| 354081 | 6/1989 | European Pat. Off. | 74/502.2 |
| 44 20 125 A1 | 2/1995 | Germany. | |

*Primary Examiner*—Anne Marie Boehler
*Assistant Examiner*—Michael Cuff
*Attorney, Agent, or Firm*—Cohen, Pontani, Lieberman & Pavane

[57] ABSTRACT

A rotary handle gearshift actuator for operating bicycle gears. The gearshift actuator includes a rotatable housing and a stationary housing. The rotatable housing has a planar surface and including an outer cylinder extending outwardly from the planar surface, the outer cylinder having an inside wall and a recess defined axially in the inside wall. The stationary housing has a planar surface and an inner cylinder extending outwardly from the planar surface of the stationary housing. The inner cylinder has a distal end and a bayonet hook extending radially outwardly from the distal end, the bayonet hook being configured for sliding engagement with the recess of the outer cylinder of the rotatable housing. The inner cylinder of the stationary housing is dimensioned to dispose concentrically within the outer cylinder of the rotatable housing so as to form a bearing point and so that the bayonet hook extends axially beyond the planar surface of the rotatable housing thereby permitting the recess of the rotatable housing to be rotated away from the bayonet of the stationary housing and thereby preventing the inner and outer cylinders from separating axially. The gearshift actuator further includes a latching mechanism for rotatively latching the rotatable housing to the stationary housing.

8 Claims, 2 Drawing Sheets

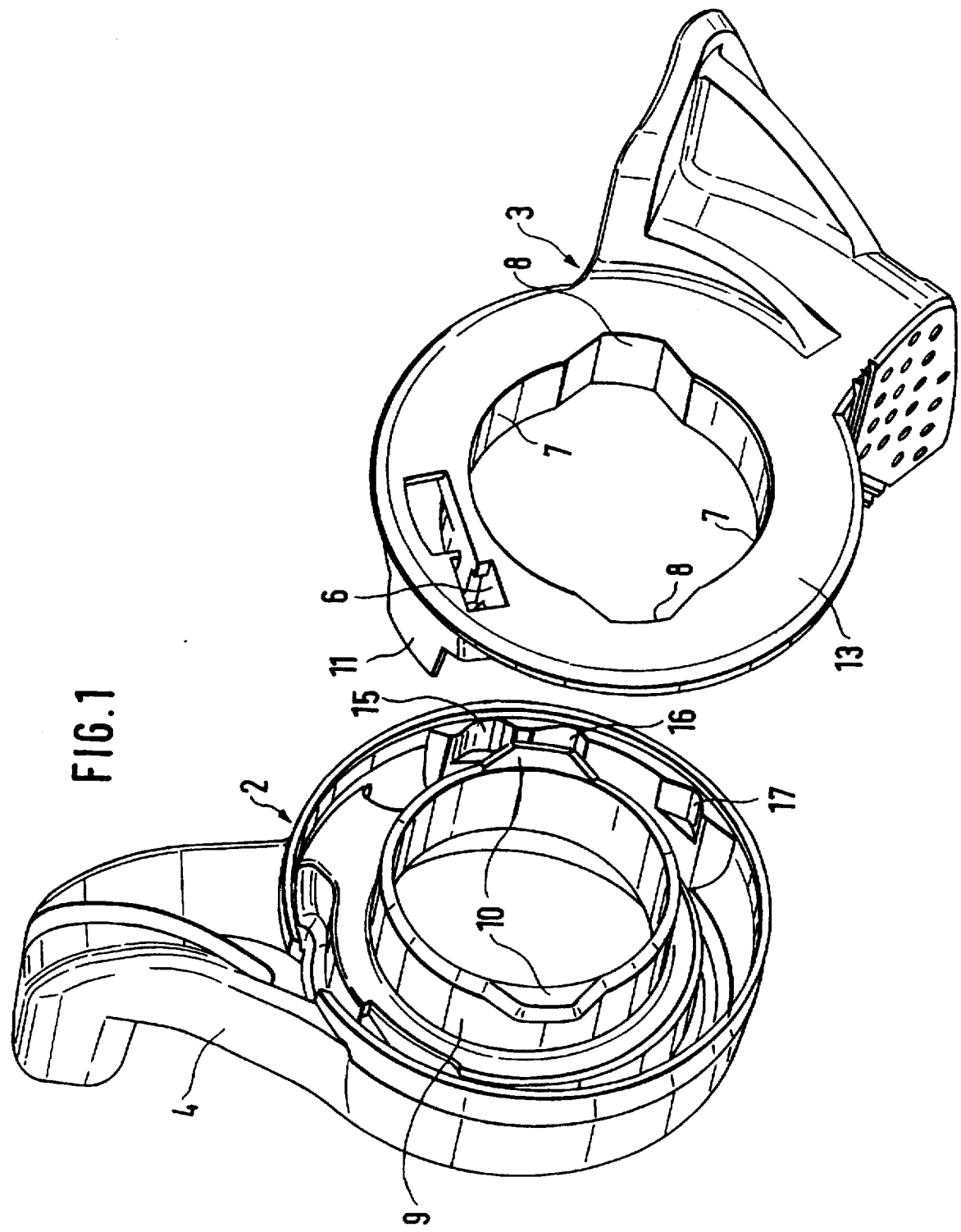

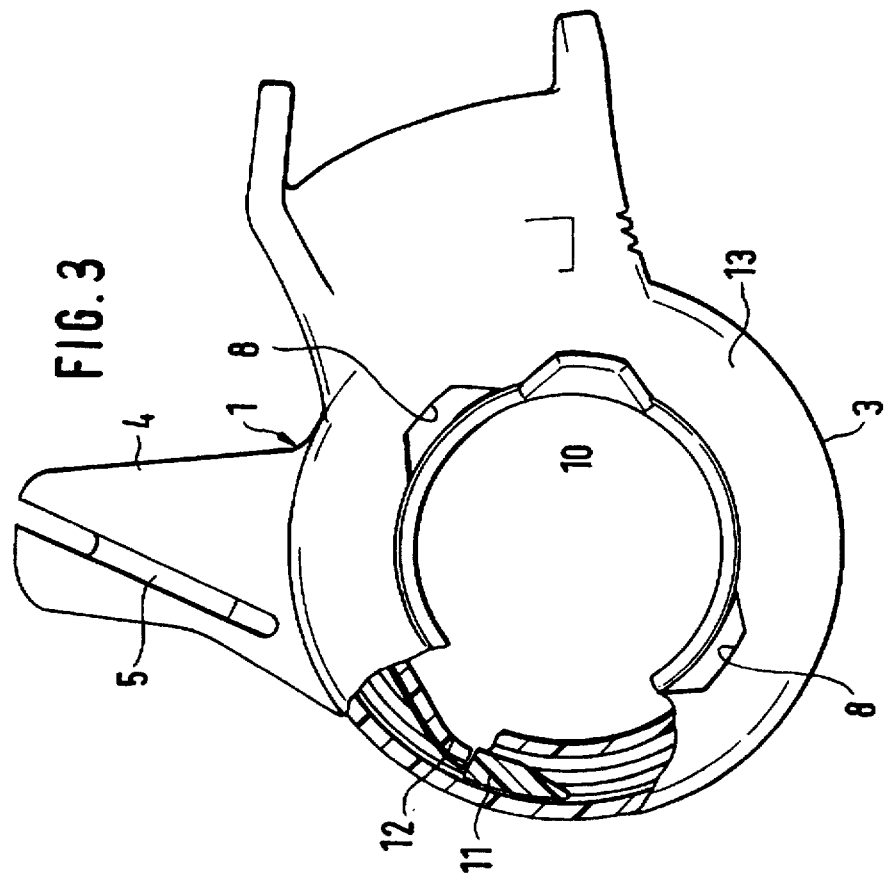
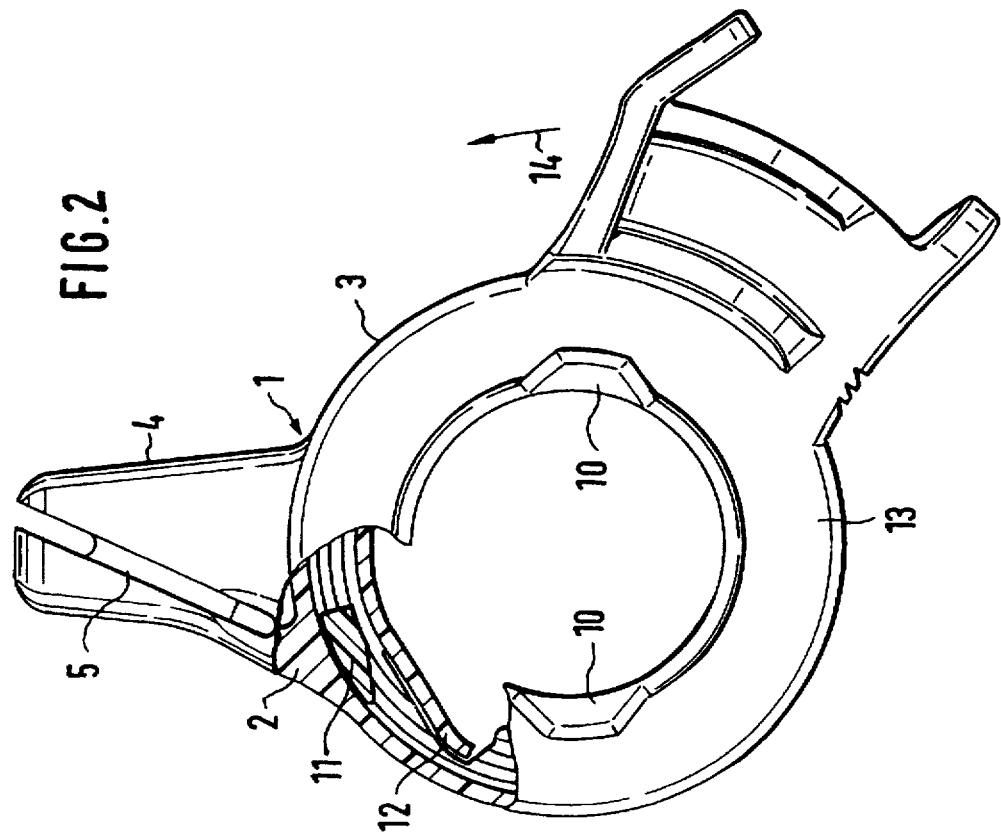

5,893,573

ROTARY HANDLEBAR-MOUNTABLE GEARSHIFT ACTUATOR FOR BICYCLES

BACKGROUND OF THE INVENTION

1. Field of the Invention

The present invention relates to gearshift actuators for bicycles and, more particularly, a rotary gearshift actuator having a stationary housing, a rotatable housing and a latching mechanism for interlocking the stationary and rotatable housings.

2. Description of the Related Art

Conventional multiple-gear bicycles employ a derailleur to transfer a bicycle drive chain from one gear sprocket to another. The derailleur is connected to a gearshift actuator through a derailleur control cable so that a bicyclist can select a desired gear by manipulating the gearshift actuator. The gearshift actuator controls movement of the derailleur by adjusting the control cable. For example, pulling the control cable causes the derailleur to shift the drive chain to a larger sprocket, and releasing the control cable permits a return spring to resiliently urge the derailleur to shift the drive chain to a smaller sprocket.

Prior art gearshift actuators, especially those mounted on the handlebar, are convenient to use; however, they do not permit easy installation or replacement of the control cable. For example, DE 44 20 125 A1 discloses a rotary handle gearshift actuator including a handle housing having two half-shell portions, a rotary ring and a carrier affixed to the rotary ring. The handle housing and the rotary ring are connected to each other in the axial direction. Thus, after the handle housing is placed at an end of the handlebar, the rotary ring cannot be easily detached because of the axial joining connection.

SUMMARY OF THE INVENTION

An object of the present invention is to provide a gearshift actuator which can be easily assembled and manufactured at a low cost.

Another object of the invention is to provide a rotary gearshift actuator having a stationary housing attachable to the handlebar and a rotatable housing which can be rotatably latched with the stationary housing.

In accordance with a preferred embodiment, a gearshift actuator for adjusting gears of a bicycle includes a rotatable housing and a stationary housing. The rotatable housing has a planar surface and including an outer cylinder extending outwardly from the planar surface, the outer cylinder having an inside wall and a recess defined axially in the inside wall. The stationary housing has a planar surface and an inner cylinder extending outwardly from the planar surface of the stationary housing. The inner cylinder has a distal end and a bayonet hook extending radially outwardly from the distal end, the bayonet hook being configured for sliding engagement with the recess of the outer cylinder of the rotatable housing. The inner cylinder of the stationary housing is dimensioned to be received concentrically within the outer cylinder of the rotatable housing so as to form a bearing point and so that the bayonet hook extends axially beyond the planar surface of the rotatable housing thereby permitting the recess of the rotatable housing to be rotated away from the bayonet of the stationary housing and thereby preventing the inner and outer cylinders from separating axially. The gearshift actuator further includes a latching mechanism for rotatively latching the rotatable housing to the stationary housing, the latching mechanism is actuated only when the rotatable housing is rotated beyond a latching point so as to axially and detachably secure the rotatable housing to the stationary housing.

In accordance with another embodiment of the present invention, the stationary housing has a cylindrical continuation with an inner cylinder, on a distal end of which bayonet hooks are arranged. When mounted, the bayonet hooks cooperate with recesses defined on an inside wall of an outer cylinder of the rotatable housing. After the two housing parts are put together, it is possible, simply by rotating them relative to each other, to axially secure the housing parts by means of locking via the bayonet hooks on a planar end surface of the distal end of the rotatable housing. As a result, the housing parts can no longer be detached from each other in the axial direction when rotated relative to each other by a certain angular displacement to a latching point. The cooperative engagement of the outer cylinder of the rotatable housing and the inner cylinder of the stationary housing enables these housings to form a bearing point, which acts independently of the attachment to the handlebar. The latching point advantageously provides a starting point for the actual gearshift path and which also acts as a stop for preventing the gearshift actuator from becoming detached when rotated in a reverse direction to overcome the latching point.

Besides the attachment device to the handlebar, all functions needed to operate the bicycle gears and to attach and mount the stationary and rotatable housings to each other are contained in the two plastic housings, i.e. the rotatable and stationary housings. When the gearshift actuator is mounted on the bicycle, the cable can be easily exchanged. Furthermore, the mounted gearshift actuator has a very short structural length in the axial direction, so that it can be mounted even on curved handlebars without special aids.

According to another aspect of the invention, the gearshift actuator is provided with a detent mechanism for detachably securing the rotatable housing to at least one gear-selecting position relative to the stationary housing, wherein the rotatable housing has a gearshifting region extending from the latching point.

According to one feature of the invention, the recess of the inner cylinder of the rotatable housing has an angular position relative to the bayonet hook of the stationary housing, such that the outer cylinder of the stationary and rotatable housings are detachably and axially secured to each other.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims.

BRIEF DESCRIPTION OF THE DRAWINGS

In the drawings:

FIG. 1 is an exploded view of a gearshift actuator of a preferred embodiment of the present invention;

FIG. 2 is a partial sectional view of the preferred embodiment of the gearshift actuator of FIG. 1 wherein the bayonet hooks of the stationary housing are slidably received in the recesses defined in the rotatable housing; and FIG. 3 is a partial sectional view of the gearshift actuator of FIG. 1 wherein the bayonet hooks are rotated relative to the recesses.

DETAILED DESCRIPTION OF THE PRESENTLY PREFERRED EMBODIMENTS

Referring now to the drawings, FIG. 1 shows a gearshift actuator 1, in particular, a rotary handle gearshift actuator for operating bicycle gears, which includes a stationary housing 2 and a rotatable housing 3. The stationary housing 2 has an inner cylinder 9 projecting outwardly from a planar surface of the stationary housing 2 toward the rotatable housing 3 and a plurality of bayonet hooks 10 (preferably two) arranged at a distal end of the inner cylinder 9. The stationary housing 2 has a shoulder 4 and is oriented, during assembly, in such a way that the inner cylinder 9 with its bayonet hooks 10 is aligned axially with the rotatable housing 3.

The rotatable housing 3 has a planar surface 13 and an outer cylinder 7 extending outwardly from the planar surface 13 and recesses 8 defined in an inside wall of the outer cylinder 7. As depicted in FIG. 1, the stationary housing 2 and rotatable housing 3 are oriented for assembly, i.e. the two housings 2 and 3 are in their mounting position, and the rotatable housing 3 can be moved toward the stationary housing 2 along a common axis or center line A—A. During assembly, the bayonet hooks 10 slide along the recesses 8 of the rotatable housing 3 until the bayonet hooks 10 protrude a distance away from the planar surface 13 of the rotatable housing 3, so that the two housings 2 and 3 can be rotated relative to each other.

The gearshift actuator 1 is shown in this position in FIG. 2, wherein relative rotation has not yet taken place. The gearshift actuator 1 includes an inventive latching mechanism, which includes a projection 11 connected to the rotatable housing 3 and a flexible tongue 12 connected to the stationary housing 2. When the rotatable housing 3 is rotated relative to the stationary housing 2 in a rotational direction 14, the projection 11 moves counterclockwise toward the flexible tongue 12. Further relative rotation of the housings 2, 3 causes the projection 11 to slide past a latching point defined by a tip of the flexible tongue 12 and a side wall of the stationary housing 2. The flexible tongue is so configured that after the projection 11 moves past the tip of this flexible tongue 12, as shown in FIG. 3, the flexible tongue 12 snaps backs to its initial or rest position and each of the recesses 8 is rotated away from and beneath the bayonet hooks 10, by at least the width of the recess 8 thereby preventing the rotatable housing 3 and stationary housing 2 from separating axially from each other.

The outer cylinder 7 on the rotatable housing 3, together with the inner cylinder 9 on the stationary housing 2, forms a bearing point around which the rotatable housing 3 can be rotated; more specifically, the housings 2 and 3 can be rotated, starting from the latching point along a gearshift path in the rotational direction 14. When the rotatable housing 3 is rotated in a reverse direction, it can reach but not move past the latching point.

It is contemplated that the flexible tongue 12 may be connected to the rotatable housing 3 and that the projection 11 may be connected to the stationary housing 2 to effect similar latching action as described above.

The gearshift actuator 1 can be further provided with a detent mechanism for gearshifting. The detent mechanism includes notches 15, 16, 17, located, preferably, in the stationary housing 2 and a latching element such as, for example, a curved spring 20, preferably arranged in the rotatable housing 3 and configured to engage the notches 15, 16, 17. The curved spring 20 is preferably configured to engage the notches 15, 16, 17 such that the spring 20 snaps into each of the notches when the spring 20 is in alignment therewith. The notches 15, 16, 17 define the gear-shifting positions of the gearshift actuator 1.

The gear-shifting region, beginning at the latching point, can be as wide as desired and have as many notches 15, 16, 17, etc. as desired, so that even bicycles with a large number of gears can be shifted by means of the economical gearshift actuator 1 of the present invention.

The shoulder 4 on the stationary housing 2 has a slot 5, through which a control cable (not shown) for operating the bicycle gears is run. The rotatable housing 3 has a hollow shaft 6 which communicates with the slot 5 when the housings 2, 3 are in their mounting position so that the nipple of the control cable can be inserted through the hollow shaft 6 and secure the cable along the direction of the slot 5.

While there have been shown and described and pointed out fundamental novel features of the present invention as applied to a preferred embodiment thereof, it will be understood that various omissions and substitutions and changes in the methods described and in the form and details of the devices illustrated, and in their operation, may be made by those skilled in the art without departing from the spirit of the present invention. For example, it is expressly intended that all combinations of those elements and/or method steps which perform substantially the same function in substantially the same way to achieve the same results are within the scope of the invention. Substitutions of elements from one described embodiment to another are also fully intended and contemplated. It is also to be understood that the drawings are not necessarily drawn to scale but that they are merely conceptual in nature. It is the intention, therefore, to be limited only as indicated by the scope of the claims appended hereto.

I claim:

1. A gearshift actuator for adjusting gears of a bicycle, comprising:

a rotatable housing having a first planar surface and including an outer cylinder extending outwardly from the first planar surface, the outer cylinder having an inside wall and a recess defined axially in the inside wall, the first planar surface being an exterior surface of the rotatable housing;

a stationary housing having a second planar surface and including an inner cylinder extending outwardly from the planar surface of the stationary housing, the inner cylinder having a distal end and including a bayonet hook extending radially outwardly from the distal end, the bayonet hook being configured for sliding engagement with the recess of the outer cylinder of the rotatable housing, the inner cylinder of the stationary housing being dimensioned to dispose concentrically within the outer cylinder of the rotatable housing so as to form a bearing point and so that the bayonet hook extends axially beyond the first planar surface of the rotatable housing thereby permitting the recess of the rotatable housing to be rotated away from the bayonet hook of the stationary housing and thereby preventing the inner and outer cylinders from separating axially; and a latching mechanism for rotatively latching the rotatable housing to the stationary housing whereby the latching mechanism is actuated only when the rotatable housing is rotated beyond a latching point so as to axially and detachably secure the rotatable housing to the stationary housing.

2. The gearshift actuator of claim 1, wherein said latching mechanism comprises a projection and a flexible tongue, said projection and said flexible tongue being arranged and configured for latching engagement with each other.

3. The gearshift actuator of claim 2, wherein the projection is arranged on one of the rotatable housing and the stationary housing and the flexible tongue is arranged on another one of the rotatable housing and the stationary housing.

4. The gearshift actuator of claim 3, wherein the projection is arranged on the rotatable housing and the flexible tongue is arranged on the stationary housing.

5. The gearshift actuator of claim 3, wherein the rotatable housing is movable in a gear-shifting region extending from the latching point, and further comprising a detent mechanism for detachably securing the rotatable housing to at least one gear-selecting position relative to the stationary housing.

6. The gearshift actuator of claim 5, wherein the detent mechanism includes a spring element located in one of the rotatable and stationary housings and the at least one gear-selecting position defined by a notch located in another one of the rotatable and stationary housings, the spring element is configured to snap into the at least one notch upon alignment therewith.

7. The gearshift actuator of claim 6, wherein the spring element is located in the rotatable housing and the at least one notch is located in the stationary housing.

8. The gearshift actuator of claim 1, wherein the recess of the inner cylinder of the rotatable housing has an angular position relative to the bayonet hook of the stationary housing, such that the outer cylinder of the stationary and rotatable housings are detachably and axially secured to each other.

* * * * *